United States Patent
Toh

[11] Patent Number: 6,124,967
[45] Date of Patent: Sep. 26, 2000

[54] APPARATUS FOR OBSERVING AN OBJECT

[75] Inventor: Minoru Toh, Toyohashi, Japan

[73] Assignee: Nidek Co., Ltd., Japan

[21] Appl. No.: 08/392,160

[22] Filed: Feb. 22, 1995

[30] Foreign Application Priority Data

Mar. 2, 1994 [JP] Japan ................... 6-058162

[51] Int. Cl.[7] .................................. G02B 21/00
[52] U.S. Cl. ................ 359/368; 359/369; 359/370; 359/389; 359/390
[58] Field of Search ................ 359/368, 370, 359/372, 385, 386, 387, 388, 389, 390; 351/205, 206, 210, 215, 221, 243; 250/201.2, 201.3

[56] References Cited

U.S. PATENT DOCUMENTS

| | | | |
|---|---|---|---|
| 4,512,642 | 4/1985 | Ito et al. | 250/201.3 |
| 4,660,094 | 4/1987 | Yoshimoto et al. | 250/201.3 |
| 4,945,220 | 7/1990 | Mallory et al. | 250/201.3 |
| 4,963,724 | 10/1990 | Neumann | 250/201.3 |
| 5,239,355 | 8/1993 | Hirose | 250/201.3 |
| 5,260,825 | 11/1993 | Nagano et al. | 250/201.3 |
| 5,270,527 | 12/1993 | Salzman | 250/201.3 |
| 5,396,063 | 3/1995 | Ito et al. | 250/201.3 |

FOREIGN PATENT DOCUMENTS

| | | | |
|---|---|---|---|
| 0227603 | 9/1990 | Japan | 250/201.3 |
| 0300707 | 12/1990 | Japan | 250/201.3 |
| 404104445 | 4/1992 | Japan | 250/201.3 |
| 405180654 | 7/1993 | Japan | 250/201.3 |

*Primary Examiner*—Cassandra Spyrou
*Assistant Examiner*—Mohammad Y. Sikder
*Attorney, Agent, or Firm*—Rossi & Associates

[57] ABSTRACT

An apparatus for observing an object comprises an illumination optical system for illuminating an object to be observed with visible light, an observing optical system for observing the object positioned within a visual field illuminated by the illumination optical system, an index projecting optical system for projecting index for focus, the optical system having projecting luminous flux of wavelength at least a part of which is common with the wavelength of illumination luminous flux of the illuminating optical system, device for restricting luminous flux of index by intermittently projecting index light from the index projecting optical system, each projecting time being set so that no photogene occur in an examiner's eye, device for restricting luminous flux of illumination by intermittently conducting illumination by the illuminating optical system when index projection is not conducted, and by restricting the time of not conducting illumination to a time not recognized by the examiner, and device for detecting an image of focus index projected on the object, wherein relative distance of the object with respect to the focus index is changed based on the results detected by the detecting device.

4 Claims, 5 Drawing Sheets

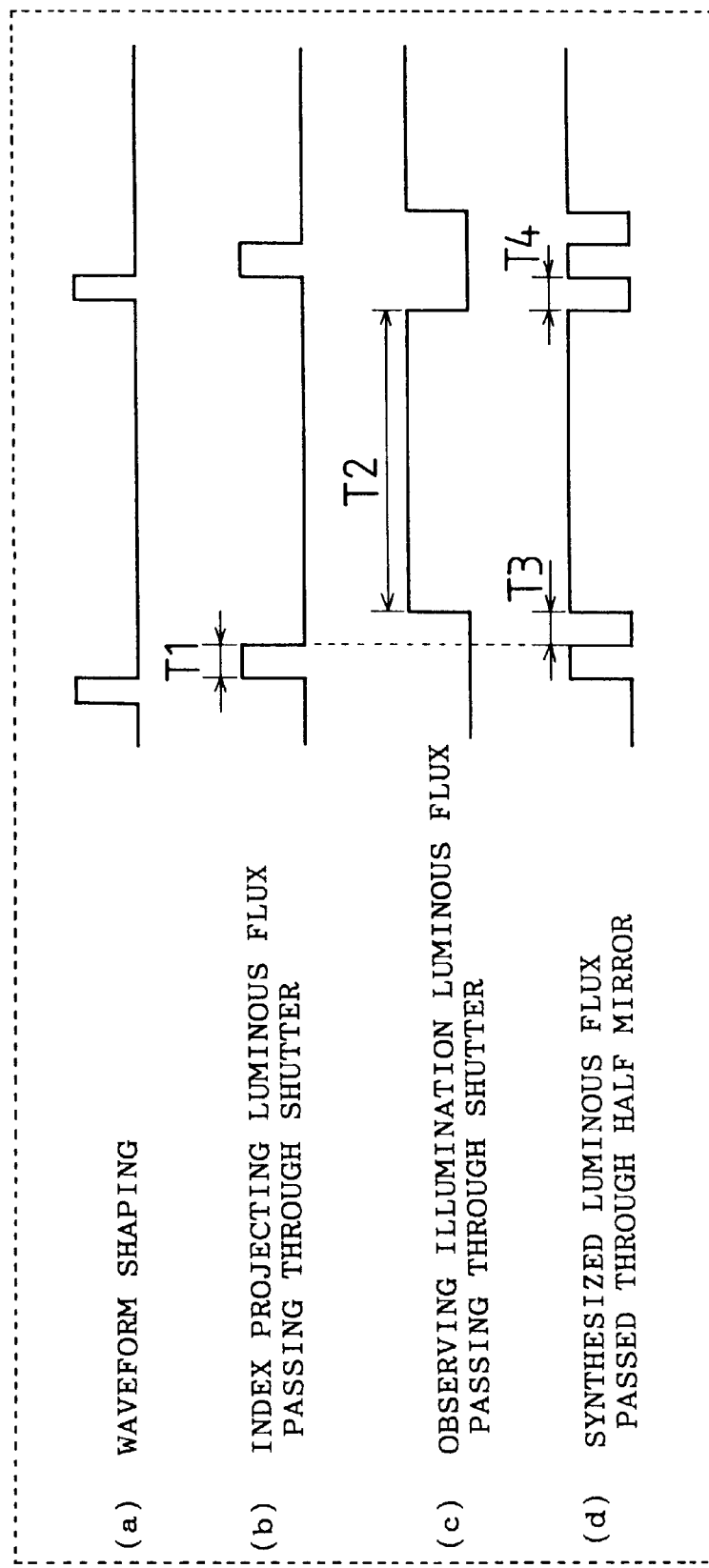

APPARATUS FOR OBSERVING AN OBJECT

BACKGROUND OF THE INVENTION

1. Field of the Invention

The present invention relates to an observing apparatus for use in microscopes and more particularly to autofocus mechanism to be used for observation and others.

2. Description of Related Art

There have been known the following two methods of autofocus mechanism which utilizes light. One method is called Passive Autofocus which is used for a case where objects to be observed have any patterns. This is to detect with optical detector a maximum point of contrast appearing on an object which is presented by natural illumination light such as sun light and the like and illumination light of observing light source and others of microscope, or to triangulate.

Another is called Active Autofocus used with respect to objects having no pattern, for instance mirror and the like. This method is to project patterns on the object or to project measurement light thereon, and then detect reflection light therefrom with an optical detector.

When the latter Active Autofocus method is used in microscope and the like, conventionally, to easily separate the natural illumination light or the illumination light of the light source from a light for autofocus, or to avoid inconvenience that patterns projected on the object may be seen by an observer, invisible light such as near-infrared light and the like has been used as luminous flux to be projected on the object.

However, general apparatuses such as microscope and others are optically designed for wavelength of visible light area. In the method of using invisible light as projecting light, as mentioned above, when trying to additionally provide autofocus mechanism in such an apparatus, it is necessary to largely reconstruct the optical system of the apparatus so as to adjust the wavelength of the light source for autofocus, causing a demerit of cost of reconstruction increasing accordingly.

To keep the reconstructing cost low, there is the possibility of damaging optical performance that the apparatus originally owns.

SUMMARY OF THE INVENTION

The present invention has been made in view of the above circumstances and has an object to overcome the above problems and to provide an apparatus for observing object, which is capable of conducting autofocus precisely, without damaging the optical performance of the apparatus and without providing any change to optical members of conventional optical products, for instance microscope and the like.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, an apparatus for observing an object of this invention comprises an illumination optical system for illuminating an object to be observed with visible light, an observing optical system for observing the object positioned within a visual field illuminated by the illumination optical system, an index projecting optical system for projecting index for focus, the optical system having projecting luminous flux of wavelength at least a part of which is common with the wavelength of illumination luminous flux of the illuminating optical system, means for restricting luminous flux of index by intermittently projecting index light from the index projecting optical system, each projecting time being set so that no photogene occur in an examiner's eye, means for restricting luminous flux of illumination by intermittently conducting illumination by the illuminating optical system when index projection is not conducted, and by restricting the time of not conducting illumination to a time not recognized by the examiner, and means for detecting an image of focus index projected on the object, wherein relative distance of the object with respect to the focus index is changed based on the results detected by the detecting means.

According to the present invention, autofocus mechanism may be additionally provided even in conventional optical apparatus such as microscope and the like without largely reconstructing them, so that optical performance of the optical apparatus will not deteriorate.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

FIG. 6 is a chart of timing signals of index projecting light and observing light.

DETAILED DESCRIPTION OF THE PREFERRED EMBODIMENTS

A detailed description of one preferred embodiment of an apparatus for observing object, embodying the present invention applied in a general microscope will now be given referring to the accompanying drawings.

[Optical system]

Figure 1:
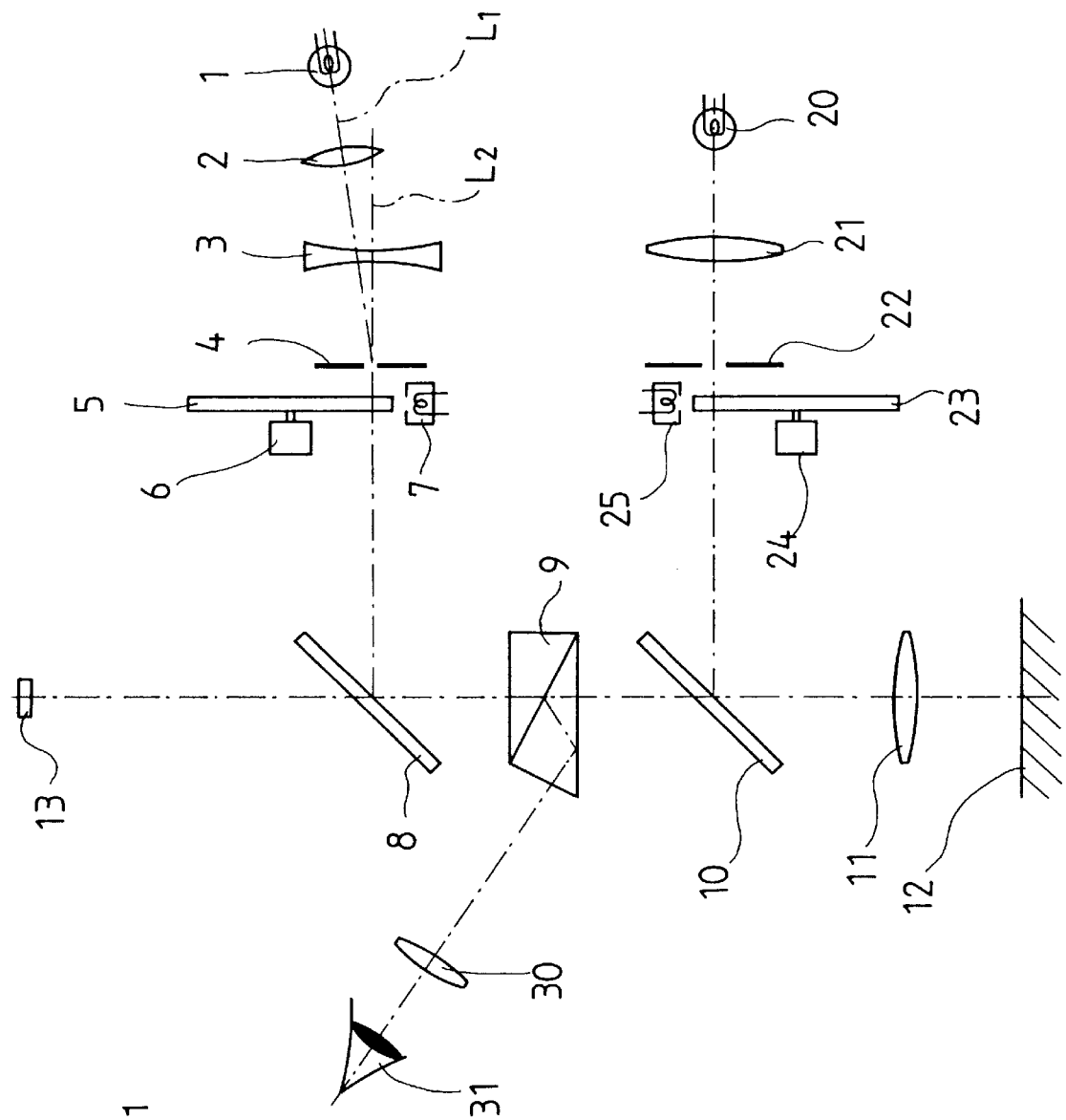
FIG. 1 is a schematic arrangement view of optical systems of an apparatus an the embodiment according to the present invention.
Figure 2:
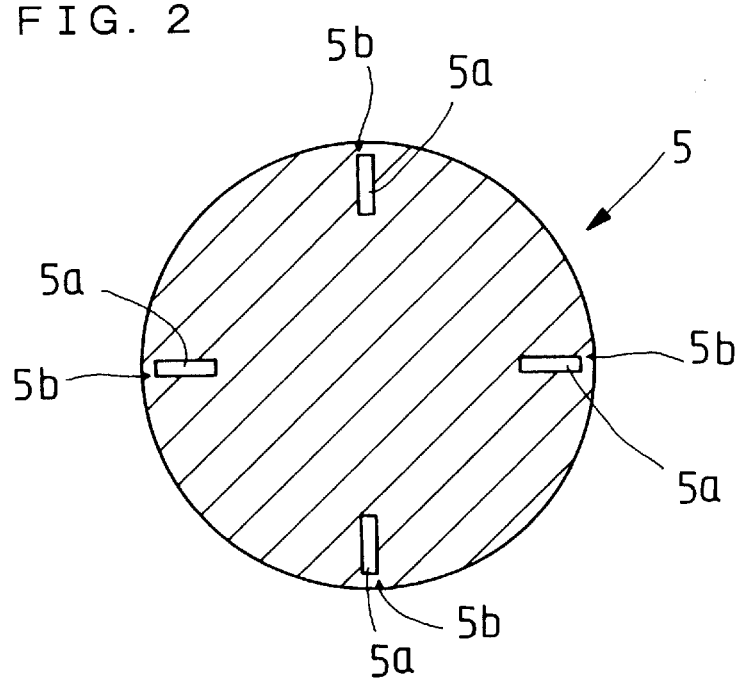
FIG. 2 is a front view of a shutter 5 in the embodiment.

FIG. 1 shows a schematic diaphragm of optical systems of the apparatus of the present embodiment, the optical systems including a focus detecting system, an illuminating system and an observing system.

(Focus detecting system)

Focus detecting system is provided with a light source 1 for projecting index, having filaments, for instance a halogen lamp which emits white light, a condenser lens 2, a concave lens 3 and a slit 4. The condenser lens 2 is disposed so that the optical axis L1 of the condenser lens 2 inclines at a predetermined angle with respect to thy; optical axis L2 of the concave lens 3. This is to reduce inclination angle so that luminous flux of the slit 4 easily comes to be incident on a surface of a position sensor detector mentioned later. Luminous flux emitted from the light source 1 passes through the condenser lens 2 and the concave lens 3 and illuminates the slit 4.

Numeral 5 is a shutter of circular plate for intermittently shutting luminous flux, which is to be driven by a motor 6. The shutter 5 has four apertures 5a arranged in a circle and four permanent magnets for index 5b to detect positions of the apertures, the permanent magnets 5b being buried in the shutter 5 so as to correspond to each position of the apertures 5a. Magnetic head 7 is for detecting that any permanent magnet 5b comes at a predetermined position in accordance with rotation of the shutter 5.

The luminous flux of slit passed through the aperture 5a of the shutter 5 is reflected by a first half mirror 8 and passes through a prism 9 of an observation system and a second half mirror 10, the n forms an image of light source on an objective lens 11, and further forms an image of slit on an object 12 to be observed.

Figure 3:
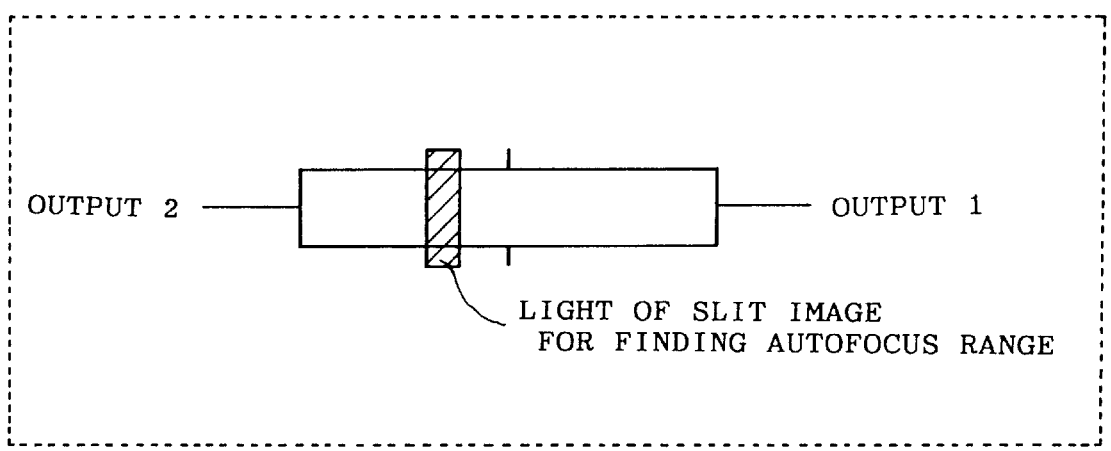
FIG. 3 is a schematic view showing a slit image projected on PSD (Position Sensor Detector)
Figure 4:
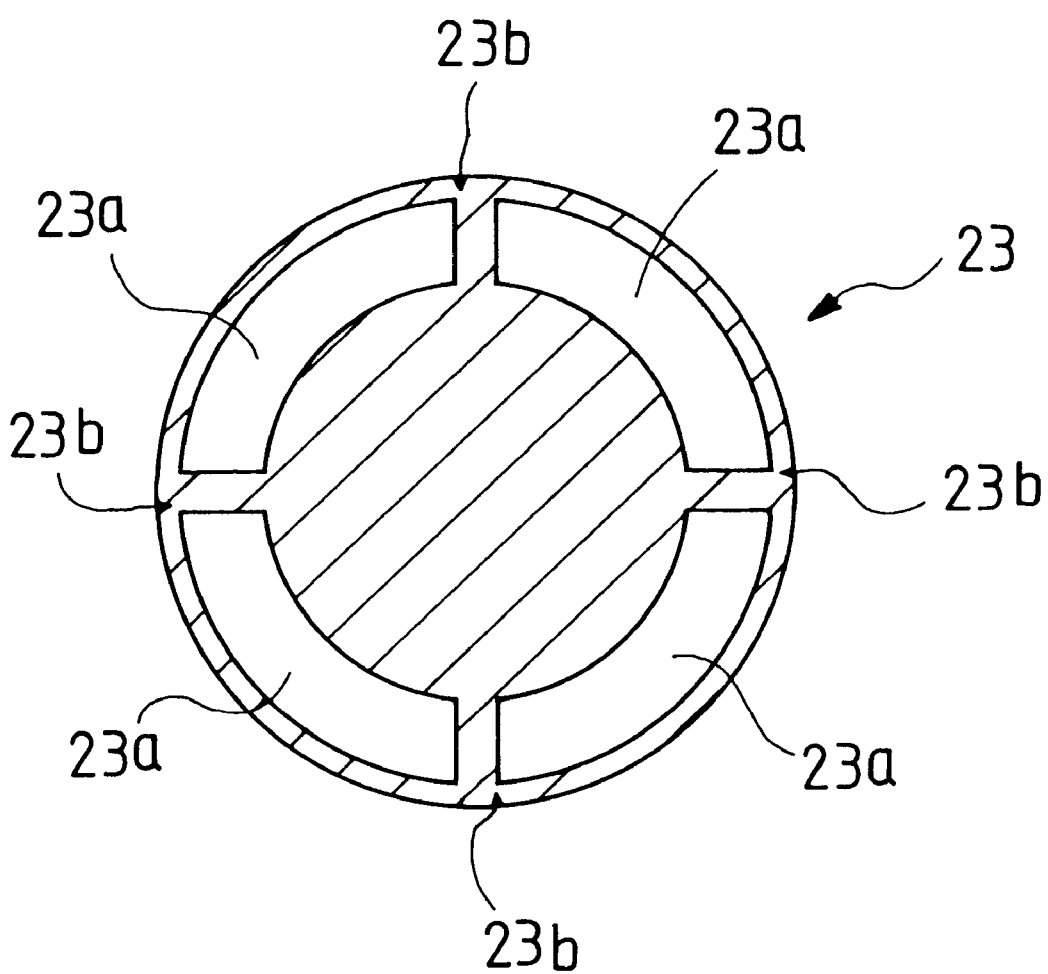
FIG. 4 is a front view of a shutter 23 in the embodiment.

The objective lens 11 forms an image of slit via the second half mirror 10, the prism 9 and the first half mirror 8 on a semiconductor position detecting element 13 disposed in a position substantially conjugated with the slit 4, the element being hereinafter said PSD (Position Sensor Detector). Since the optical axis L1 is inclined with respect to the optical axis L2, the slit image formed on the PSD 13 changes its forming position according to the distance to the observing object 12 as shown in FIG. 3. The PSD 13 finds voltage difference between outputs 1 and 2 shown in FIG. 3 based on the center of gravity of light of the slit image, and detects the focus distance and direction to the observing object 12.

(Illumination system)

Illumination system is constructed of a source 20 of an observing light, for instance a halogen lamp and the like as similar as the light source 1, a condenser lens 21, an aperture diaphragm 22 and a shutter 23 having four apertures 23a and permanent magnets 23b for index of position, the size of the aperture 23a being different size from the aperture 5a of the shutter 5. The shutter 23 is rotated by a motor 24 to intermittently shut illumination light from the light source 20. Numeral 25 is a magnetic head which serves for detecting the permanent magnet 23b for index of the shutter 23.

In this system, luminous flux passed through the aperture 23a of the shutter 23 is reflected the second half mirror 10 to illuminate the observing object 12 via the objective lens 11.

(Observing system)

Observing system is constructed of eyepiece 30, the prism 9 and the objective lens 11. Observer's eye 31 observes through the eyepiece 30 the object 12 illuminated by the illumination system.

[Control system]

Figure 5:
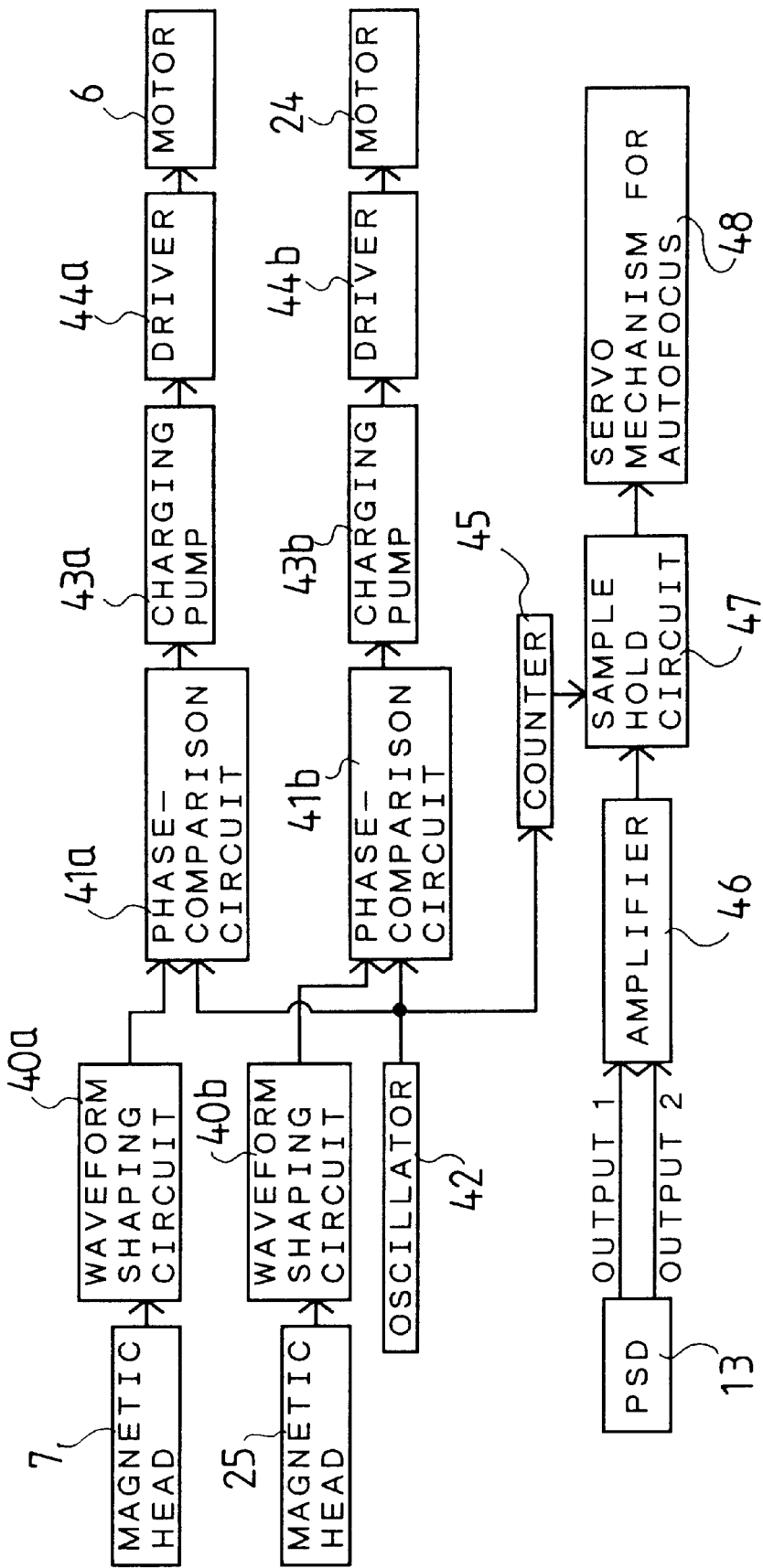
FIG. 5 is a block diagram of main electric system of the apparatus in the embodiment.

FIG. 5 is a block diagram of a main electric system of the above mentioned optical systems. This electric system includes a phased locked loop circuit system (being hereinafter said PLL circuit) and an index detection processing system.

(Phased locked loop circuit system)

The magnetic head 7 generates a pulse signal in a form of differential waveform when the permanent magnet 5 comes at a predetermined position. The pulse signal is shaped in a waveform shaping circuit 40a and then transmitted to a phase-comparison circuit 41a. The phase-comparison circuit 41a compares the pulse signal and an output signal of an oscillator 42 which generates reference frequency and, when finding difference therebetween, provides sign and amplitude of the difference to a charging pump 43a. The charging pump 43a integrates the pulse signed of the difference and transmits it a driver 44a as a signal for controlling speed of the motor 6.

Similarly, a pulse signal generated from the magnetic head 25 is shaped in a waveform shaping circuit 40b and compared with reference frequency of the oscillator 42 at a phase-comparison circuit 41b. Based on the comparison results, the charging pump 43a transmits a speed control signal of the motor 24 to a driver 44b.

Numeral 45 is a counter which serves for producing passing time T1–T4 for that luminous flux passes through each shutter, shown in FIG. 6, and a circuit for transmitting each timing of luminous flux passing through each shutter to the index detecting system to provide timing of receiving and processing light.

(Index detecting processing system)

Numeral 46 is an amplifier for detecting and processing signals of voltage from the outputs 1 and 2 of the PSD 13 to detect position of the object 12. Numeral 47 is a sample hold circuit for sampling output of the amplifier 46 in timing of T1 provided by the counter 45. Numeral 48 is an autofocus servo mechanism for moving the observing object 12 at a focussing position in an optical axis direction based on the sampling result of the sample hold circuit 47.

[Operation]

Operation of the apparatus constructed above will be described hereinafter, with parts relating to autofocus as the point.

The observer puts the observing object 12 on a table not shown in the figure, turns on the light source 20 for observation and moves the observing object 12 so as to locate the objective portion of the object 12 within an observing visual field. The observer then depresses an operational switch not illustrated to work the light source 1 and the motors 6 and 24 whereby autofocus mechanism is driven.

When magnetic heads 7 and 25 detect permanent magnets 5b and 23b for index respectively, detection signals transmitted via waveform shaping circuits 40a and 40b to the phase-comparison circuit 41a and 41b are compared with reference signals of the oscillator 42. Based on the compared results, each rotational speed of motors 6 and 24 is controlled and both motors 6 and 24 are synchronously rotated by the drivers 44a and 44b respectively.

Luminous flux from the light source 1 for index projection is intermittently shut off by the shutter 5 and similarly luminous flux from the light source 20 for observation is also intermittently shut off by the shutter 23.

When waveform shaping circuit 40a and 40b generate a waveform shaping signal (a) shown in FIG. 6, a timing signal of luminous flux from the light source 1 for index projection passing through the shutter 5 is represented by (b) and a timing signal of luminous flux from the light source 20 for observation passing through the shutter 23 is represented by (c) respectively shown in FIG. 6, and a synthesizing signal of both luminous flux when synthesized by the second half mirror 10 and illuminated to the object 12 to be measured is represented by (d).

In FIG. 6, T1 indicates time for that index projecting luminous flux passes through the shutter 5, T2 indicates time for that illuminating luminous flux for observation passes through the shutter 23, T3 indicates time from shutting of the index projecting luminous flux to beginning of passing of observing luminous flux therethrough, and T4 indicates time from the shutter 23 shutting off the observing luminous flux to the shutter 5 beginning passing the index projecting luminous flux therethrough. Time (T1) while index projecting luminous flux is passing through the shutter 5 is set so sufficiently short as to disregard photogene occurring in observer's eye as compared with time (T2) while observing luminous flux is passing through the shutter 23. The observer's eye 31 will not therefore recognize the image of slit.

Each time of T1, T2, T3 and T4 is determined according to rotating speed of motors 6 and 24, size of apertures 5a and 23a of shutters 5 and 23, and position of permanent magnets 5b and 23b for index.

In the present embodiment, the time T3 is provided in consideration of late processing speed of PSD 13 and the acquisition time of the sample hold 47, the time T4 in consideration of conducting discharge of PSD 13. It is possible to easily change each period of T3 and T4 according to response time of each element.

In a case where luminous flux incident on a detecting element of PSD 13 has the decentering center of gravity, voltage difference occurring between the output 1 side and the output 2 side, the voltage difference is detected and processed in the position detecting amplifier 46. The counter 45 transmits timing signals T1–T4 to the sample hold circuit 47. The sample hold circuit 47 samples the output signal of the amplifier 46 in the timing of T1, and holds output signals of time T2 and T3. When detecting a distance to and a direction of a focus point based on the sampled signal, the autofocus servo mechanism 48 is driven in accordance with such information to move the table along the optical axis to the focus point.

The present invention may be embodied in other specific forms without departing from the spirit or essential characteristics thereof. For instance, though a halogen lamp is used for an index projecting light source in the above embodiment, LED or laser light and others may be replaced with. When using LED or laser light, shutter 5 and control circuit of shutter 5 are unnecessary and it is enough to control LED or laser light to emit light only in the time T1. It is also possible to construct the shutter 5 of liquid crystal and to electrically conduct transmitting therethrough and shutting of luminous flux.

Light emitting element is not limited to PSD and may use CCD line sensor and others. If using such CCD line sensor, then it is sufficient to put optic storage time of the CCD line sensor in the time T1 in FIG. 6 and position reading time in times excepting T1.

In the present embodiment, each position of permanent magnets buried in shutters 5 and 23 is detected by each magnetic head. It is alternatively possible to provide pin holes instead of permanent magnets and to detect the position of pin hole through any optical sensor.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An apparatus for observing an object comprising:

an illuminating optical system for illuminating an object to be observed with visible light;

an observing optical system for observing the object positioned within a visual field illuminated by said illuminating optical system;

an index projecting optical system for projecting index for focus by luminous flux having wavelength of a visible area, the index projecting optical system having projecting luminous flux at least a part of which is common with a wavelength of illumination luminous flux of said illuminating optical system;

a first luminous flux restricting means for cutting an illuminating light of the illuminating optical system;

a second luminous flux restricting means for cutting a projecting light of the index projecting optical system;

means for controlling said first luminous flux restricting means and said second luminous flux restricting means so that the illuminating light and the projecting light do not overlap with each other on said object, and for controlling the period the illuminating light is off and the projecting light is on such that the projecting light is imperceptible as an after image to a normal human eye; and means for restricting luminous flux of index by intermittently projecting index light from said index projecting optical system, each projecting time being set so that no photogene occur in an examiner's eye;

means for restricting luminous flux of illumination by intermittently conducting illumination by said illuminating optical system when index projection is not conducted, and by restricting the time for not illuminating to a period means for detecting an image of focus index projected on said object, said means being capable of detecting luminous flux of visible wavelength;

wherein relative distance of said object with respect to the focus index is changed based on the results detected by said detecting means.

2. An apparatus for observing an object in accordance with claim 1, wherein said second luminous flux restricting means comprises a shutter disposed in a side of the object with respect to an index plate of said index projecting optical system.

3. An apparatus for observing an object in accordance with claim 1, wherein said second luminous flux restricting means comprises means for controlling the index light source to blink.

4. An apparatus for observing an object in accordance with claim 1, wherein said index projecting optical system has a center luminous flux meeting at a predetermined angle with an optical axis of detecting light of said detecting means and said detecting means detects the position of the focus index.

* * * * *